United States Patent [19]

Rademacher et al.

[11] Patent Number: 4,473,615
[45] Date of Patent: Sep. 25, 1984

[54] MOLDED ARTICLES COMPRISING FIBER REINFORCED POLYETHER MODIFIED STYRENE POLYMERS

[75] Inventors: Leo E. Rademacher, Springfield, Mass.; Edward F. Tokas, Crystal Lake, Mo.

[73] Assignee: Monsanto Company, St. Louis, Mo.

[21] Appl. No.: 563,900

[22] Filed: Dec. 21, 1983

[51] Int. Cl.$^3$ .............................................. B32B 27/00
[52] U.S. Cl. .................................... 428/251; 264/240; 264/324; 428/268; 428/273; 428/285; 428/288; 428/290
[58] Field of Search ............... 428/268, 251, 273, 285, 428/288, 290; 264/240, 324

[56] References Cited

U.S. PATENT DOCUMENTS 3,022,210  2/1962  Phillips ................................ 156/180
3,635,879  11/1969  Baer et al. ........................ 260/41 AG

OTHER PUBLICATIONS

Encyclopedia of Polymer Science and Technology, Wiley, 1970, vol. 12, pp. 32, 33, 36.

*Primary Examiner*—Marion E. McCamish
*Attorney, Agent, or Firm*—R. Bruce Blance; William J. Farrington; Paul D. Matukaitis

[57] ABSTRACT

Molded articles comprising fiber reinforced polyether modified styrene polymer wherein the weight ratio of glass fiber to styrene polymer is in the range of about 55:45 to about 75:25. The molded articles are prepared by a transfer molding process in which glass fiber mat containing 1 to 5 weight percent of an unsaturated polyester binder is impregnated with styrene monomer mixture containing an unsaturated polyether and the mold is subjected to conditions which induce fast polymerization of the monomer mixture. The molded articles possess resistance to heat distortion.

6 Claims, No Drawings

MOLDED ARTICLES COMPRISING FIBER REINFORCED POLYETHER MODIFIED STYRENE POLYMERS

BACKGROUND OF THE INVENTION

This invention relates to molded articles comprising fiber reinforced polyether modified styrene polymers which are resistant to heat distortion, and to a method of manufacturing such articles. More particularly the invention is directed to molded articles comprising polyether modified styrene polymers reinforced with a high concentration of glass fiber, and to a method of manufacturing such articles by a transfer molding process.

Unsaturated polyesters and solutions of unsaturated polyesters in styrene monomer have been applied to glass reinforcement to provide molded articles which are hard, and have flexural strength and heat distortion resistance. However such unsaturated polyester systems are high in viscosity and must be applied at high pressure and temperature to provide void free moldings. Moreover the molded articles obtained from them tend to be brittle and to require a post-curing step to complete the cure of the unsaturated groups. Molded articles comprising styrene polymers reinforced with moderate amounts of glass fiber to provide a modest increase in the heat distortion temperature have been prepared by injection molding methods. Molded articles comprising glass fiber reinforced polystyrene containing a high volume ratio of fiber reinforcement to styrene polymer in the range of about 55:45 to about 75:25 have been prepared by a transfer molding process and were found to have a high heat distortion temperature.

We have now found that molded articles comprising polyether modified styrene polymers reinforced with at least about 45 weight percent of a reinforcing glass fiber, prepared by a monomer transfer molding process, possess toughness and resistance to heat distortion and do not require a post-curing step for completion of the cure. The molded articles comprise a glass fiber reinforced polyether modified styrene polymer wherein the weight ratio of the fiber reinforcement to the styrene polymer is in the range of 45:55 to 75:25 and wherein the glass fiber reinforcement is a mat or weave of fibers of length at least about 25 mm and of diameter in the range of about 5 to about 25 microns. The heat distortion temperature of the fiber-reinforced cross-linked styrene polymer determined under a load of 264 psi (1819 kPa) is generally above about 200° C.

The polyether modified styrene polymer is a polymer of styrene or a copolymer of styrene and acrylonitrile comprising up to 50 weight percent acrylonitrile modified with from about 1 to about 25 parts of polyether per hundred parts of polymer. The styrene polymer is advantageously prepared by fitting a weave or mat of the long glass fibers into the cavity of a transfer mold, closing and clamping the mold, filling the free space in the mold with monomer mixture containing a free radical initiator, heating the mold to a temperature which allows polymerization of the monomers initiatied by the free radical initiator to proceed to about a 98 percent conversion, opening the mold and removing the molded article. The time required for polymerization is generally less than about 30 minutes.

The polyether modified styrene polymer is obtained by copolymerizing about 75 to about 99 parts by weight of styrene or the mixture of styrene and acrylonitrile with from about 1 to about 25 parts by weight of a polyacrylyloxy polyether represented by the formula:

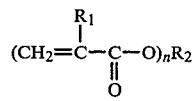

wherein $R_1$ is hydrogen or $CH_3$, $R_2$ is moiety derived from a poly($C_1$ to $C_4$ oxacycloalkane)polyol of hydroxyl functionality m in the range of 2 to 6 and of molecular weight in the range of about 1000 to about 6000 and wherein n is at least 2 and is equal to or less than m.

Examples of suitable poly($C_1$ to $C_4$ oxacycloalkane)polyols are the $C_1$ to $C_4$ oxacycloalkane adducts of simple $C_2$ to $C_6$ polyols such as ethylene glycol, propylene glycol, glycerol, trimethylolpropane, pentaerythritol, sorbitol, 1,6-hexane diol and 1,2,6-hexane triol, the $C_1$ to $C_4$ oxacycloalkanes being selected from the group consisting of ethylene oxide, propylene oxide, 1,2-butylene oxide, oxacyclobutane and tetrahydrofuran. The polyacrylyloxy derivatives may be obtained by esterification of the poly($C_1$ to $C_4$ oxacycloalkanes)polyols with (meth)acrylic acid or (meth)acrylyl chloride.

The fiber-reinforcement of the molded article is a weave or mat of fibers of at least about 25 mm in length and of diameter in the range of about 5 to about 25 microns. The glass fiber mat is formed from chopped strands of fiber which have been treated with a silane or chromic chloride coupling agent such as vinyltriethoxysilane, vinyltrimethoxysilane, γ-methacryloxypropyltrimethoxysilane or methacrylato chromic chloride. The mat is sized with from about 1 to about 5 weight percent of a binder comprising an unsaturated polyester of molecular weight in the range of about 1000 to about 10000, prepared by condensation of a mixture of saturated and unsaturated dicarboxylic acids and glycols of the type conventionally used in the manufacture of such unsaturated polyesters, the unsaturated acids being maleic and fumaric acids present in a concentration of about 10 to about 100 mole percent of the total dicarboxylic acid. Suitable glycols include ethylene glycol, propylene glycol, diethylene glycol, polyethylene glycols, polypropylene glycols and poly(tetramethylene glycols) of molecular up to 400, 1,6-hexanediol, and 1,4-dimethylol cyclohexane. Suitable dicarboxylic acids include phthalic acid, isophthalic acid, terephthalic acid, succinic acid, adipic acid and azelaic acid. Preferably the unsaturated polyester has a melting point in the range of about 50° to about 150° C.

The mold used in the transfer molding process need not be designed for high pressure as is required for injection molding. The molds are advantageously made of low priced metals or fiber reinforced thermoset resins backed by metal supports of designs suitable for withstanding 350–2100 kPa pressure. The mixture of monomers is introduced into the mold by pumping or other suitable means.

To provide a polymerization time less than about 30 minutes, the particular initiator or combination of initiators, and the amount thereof will vary depending on the type of monomer(s) used. For mixtures of styrene and polyacrylyloxy polyether for example, a commonly used initiator is tert.-butyl perbenzoate in the amount of 0.8 to 1.0 mole percent. For mixtures of styrene, acrylonitrile and polyacrylyloxy polyether there is used advantageously a combination of two or more peroxides whose decomposition temperatures differ by 20° C. or more, for example, 0.4 mole percent each of lauroyl and benzoyl peroxides and tert-butyl perbenzoate. The choice of initiator(s) should be made on the basis of reaction temperature used, the volatility of the monomers and the decomposition temperature of the initiator.

The concentration of free radical initiator(s) is advantageously in the range from about 0.4 to about 1.5 mole % of the monomer composition. The preferred temperatures of reaction are about 90°-110° C. for acrylonitrile monomers mixtures. This range is preferred because of the high vapor pressure of acrylonitrile. When acrylonitrile is omitted, temperatures of about 90°-150° C. are preferred.

Other elements which maybe present in the compositions and are conveniently added in the monomer mixture are promoters such as conventional metal driers for example cobalt naphthenate to increase the rate of polymerization. Fillers such as clay, talc, glass spheres, mica, etc. may be added as partial replacement for the fiber reinforcement provided that the total fiber and filler content is maintained in the weight range of about 25 to about 55 weight percent and provided further that no more than 20 weight percent of fiber reinforcement is replaced with filler. Stabilizers, release agents, such as wax and pigments, etc. may also be added. The materials and process are useful for making highly glass loaded, economical composites with high heat resistance and excellent stiffness and strength.

The following examples are set forth to illustrate the invention but are not intended to limit its scope. Units and percentages are by weight unless stated otherwise.

EXAMPLE 1

Several layers of unwoven glass mat of 51 g weight per sq. meter, comprising chopped strand fibers of 50 mm in length, bound with 3 weight percent of an unsaturated maleate polyester are fitted into a cavity 3.2 mm deep of a mold comprising two Teflon coated plates and a shim creating the cavity, and having a charging part fitted with a small reservoir for excess monomer and a vent. The amount of glass is chosen to result in a composite consisting of 60% glass and 40% polymer matrix.

The mold is then bolted shut and a vacuum is pulled on the cavity (about 5 Torr).

A mixture of styrene, 76 parts, acrylonitrile, 24 parts, and 0.4 mol. % each of lauroyl and benzoyl peroxides and t-butyl perbenzoate is sucked into the mold and the reservoir at room temperature.

The vent is sealed and the reservoir is pressurized to 550 kPa with nitrogen so as to force more of the monomer mixture into the mold to compensate for shrinkage during the polymerization. The mold is placed in a constant temperature bath at 100° C. for 30 minutes. It is then removed and cooled to room temperature.

The molded piece is removed from the mold and tested for various properties as given in the Table below.

TABLE 1

PROPERTIES OF MOLDINGS

| Ex. No. | Matrix Parts by wt. | | | Initiator | | Polymerization | | | DTUL,C.° .82 MPa | Flexural Modulus MPa | Flexural Strength MPa |
|---|---|---|---|---|---|---|---|---|---|---|---|
| | Styrene | AN | Unsat. Polyether | Type | Mol % | Weight % Glass | Temp. C.° | Time Min. | | | |
| 1 | 76 | 24 | 0 | L + B + T | 0.4Ea | 60 | 100 | 30 | 130 | 2,420 | 190 |
| 2 | 76 | 24 | 0 | L + B + T | 0.4Ea | 53 | 100 | 30 | 126 | 0,350 | 142 |
| 3 | 61 | 19 | 20 | L + B + T | 0.4Ea | 53 | 100 | 30 | 130 | 1,900 | 93 |
| 4 | 61 | 19 | 20 | L + B + T | 0.4Ea | 43 | 100 | 30 | 120 | — | — |
| 5 | 61 | 19 | 20 | L + B + T | 0.4Ea | 40 | 100 | 30 | 12 | 1,830 | 38 |
| 6 | 68 | 22 | 10 | L + B + T | 0.4Ea | 72 | 100 | 30 | >230 | 1,660 | 176 |
| 7 | Commercial Polyester | | (1) | MEKO$_2$ | — | 60 | 100 | 30 | 130 | 3,800 | 74 |
| 8 | Commercial Polyester | | (2) | " | — | 40 | 25 | 6 hr. includes post cure) | >200 | 1,970 | 10 |

Note
(1) Resin does not fill mold completely because of high viscosity
(2) Highest glass loading permitting mold filling.
Code: AN = acrylonitrile, MEKO$_2$ = methyl ethyl ketone peroxide
Initiators L = lauroyl peroxide, B = benzoyl peroxide, T = t = butyl perbenzoate

EXAMPLE 2

The process of Example 1 is repeated with the exception that 53 weight percent of glass fiber mat is used. Results are shown in the Table.

EXAMPLES 3, 4, 5 AND 6

The process of Example 1 is repeated except that part of the monomer mixture is a trimethacrylyloxy copolyether of ethylene oxide and propylene oxide. The copolyether is prepared by addition polymerization of propylene oxide to glycerol, followed by addition polymerization of ethylene oxide to provide a polyether triol of molecular weight 4800 containing a ratio of 3 propyleneoxy units to 1 ethyleneoxy unit, 70 percent of the hydroxy groups being primary and the hydroxyl number being 35.5 g KOH per g. The trimethacrylyloxy copolyether is obtained by reacting the polyether triol with methacrylyl chloride. The amounts of glass in the three examples are shown in the Table.

EXAMPLES 7 AND 8

A commercial unsaturated polyester sold by Ashland Oil Co. under the tradename Aropol 7241 RT is used to provide the polymeric matrix in a glass reinforced transfer molded part prepared by the process of Example 1. Results shown in the Table indicate that the polyester is too viscous to be used with more than about 40% glass.

We claim:
1. A molded article comprising a glass fiber reinforced polyether modified styrene polymer wherein the weight ratio of the glass fiber reinforcement to the sty- rene polymer is in the range of about 45:55 to about 75:25, wherein the glass fiber reinforcement is a mat or weave of fibers of length at least about 25 mm and of diameter in the range of about 5 to about 25 microns containing from about 1 to about 5 weight percent of an unsaturated polyester binder of molecular weight in the range of about 1000 to about 10000, wherein the polyether modified styrene polymer is obtained by copolymerizing a polyacrylyloxy polyether with a styrene monomer mixture in a weight ratio of 1 to 99 to 25 to 75, and wherein the styrene monomer mixture comprises up to 50 weight percent acrylonitrile.

2. The molded article of claim 1 wherein the heat distortion temperature determined under a load of 264 psi (1819 kPa) is above 200° C.

3. The molded article of claim 1 wherein the polyacrylyloxy polyether is represented by the formula:

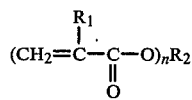

wherein $R_1$ is hydrogen or $CH_3$, $R_2$ is a moiety derived from a poly($C_1$ to $C_4$ oxacycloalkane)polyol of hydroxyl functionality m in the range of 2 to 6 and of molecular weight in the range of about 1000 to about 6000 and wherein n is at least about 2 and is equal to or less than m.

4. A process of preparing a molded article of a fiber-reinforced polyether modified styrene polymer of heat distortion temperature above 200° C. determined under a load of 264 psi (1819 kPa), and weight ratio of the glass fiber reinforcement to the styrene polymer in the range of about 45:55 to about 75:25, said process comprising:

A. fitting a weave or mat of glass fibers of length at least about 25 mm and of diameter in the range of about 5 to about 25 microns containing from about 1 to about 5 weight percent of an unsaturated polyester binder of molecular weight in the range of about 1000 to about 10000 into the cavity of a transfer mold;

B. closing and clamping the mold;

C. filling the free space in the mold with a mixture comprising a polymerization effective amount of a free-radical initiator, 1 to 25 weight % polyacrylyloxy polyether, and 99 to 75 wt. % of a styrene monomer mixture comprising from 50 to 100 parts styrene and 50 to 0 parts acrylonitrile;

D. heating the mold to a temperature which allows the polymerization of the monomers, initiated by the free radical initiator to proceed to about a 98 percent conversion; and E. opening the mold and removing the molded article.

5. The process of claim 4 wherein the fibers are of diameter in the range of about 5 to about 25 microns and of length at least about 25 mm.

6. The process of claim 4 wherein the polyacrylyloxy ether is represented by the formula:

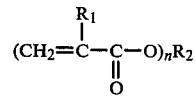

wherein $R_1$ is hydrogen or $CH_3$, $R_2$ is a moiety derived from a poly($C_1$ to $C_4$ oxacycloalkane)polyol of hydroxyl functionality, m, in the range of 2 to 6 and of molecular weight in the range of about 1000 to about 6000 and wherein n is at least 2 and is equal to or less than m.

* * * * *